US00RE43766E

(19) United States
(12) Reissued Patent
Ostaseski

(10) Patent Number: US RE43,766 E
(45) Date of Reissued Patent: Oct. 23, 2012

(54) BRA STRAP RETAINER

(76) Inventor: Michelle D. Ostaseski, Locust Valley, NY (US)

(21) Appl. No.: 12/575,600

(22) Filed: Oct. 8, 2009

Related U.S. Patent Documents

Reissue of:
(64) Patent No.: 7,278,900
Issued: Oct. 9, 2007
Appl. No.: 11/087,929
Filed: Mar. 23, 2005

U.S. Applications:
(63) Continuation-in-part of application No. 10/609,431, filed on Jun. 27, 2003, now abandoned.

(51) Int. Cl.
*A41C 3/00* (2006.01)

(52) U.S. Cl. ..... 450/86; 2/336; 24/198; 24/301; 450/88; 450/1

(58) Field of Classification Search ..... 450/86, 450/88, 1; 2/338, 336, 326, 327, 310–312; 24/302, 198, 336, 563, 545, 300, 301, 102 A, 24/102 B, 72.7
See application file for complete search history.

(56) References Cited

U.S. PATENT DOCUMENTS

| | | | | | |
|---|---|---|---|---|---|
| 1,401,227 | A | * | 12/1921 | Wyeth | 2/323 |
| 1,536,683 | A | * | 5/1925 | Moreaux | 224/220 |
| 1,782,057 | A | * | 11/1930 | Bollinger | 24/301 |
| 1,792,128 | A | * | 2/1931 | Stevenson | 24/371 |
| 1,804,308 | A | * | 5/1931 | Bollinger | 24/515 |
| 2,140,164 | A | | 12/1938 | Moffatt | |
| 2,229,003 | A | | 1/1941 | Fly | |
| 2,278,153 | A | | 3/1942 | Shaulson | |
| 2,444,806 | A | | 7/1948 | Cleasby | |
| 2,595,139 | A | | 4/1952 | Hart | |
| 2,693,625 | A | | 11/1954 | Van Buren, Jr. | |
| 2,861,311 | A | * | 11/1958 | Kurland | 24/300 |
| 3,126,600 | A | * | 3/1964 | Demarre | 24/301 |
| 3,186,704 | A | * | 6/1965 | McCloskey et al. | 269/9 |
| 3,218,686 | A | * | 11/1965 | Rubenstein | 24/198 |
| 3,529,329 | A | | 9/1970 | Burleson | |
| 4,592,118 | A | | 6/1986 | DeWoskin | |
| 4,612,935 | A | | 9/1986 | Greifer | |
| 4,704,745 | A | | 11/1987 | Reaver | |
| 4,764,988 | A | | 8/1988 | Reaver | |
| 4,953,233 | A | | 9/1990 | Moshier | |
| 5,060,348 | A | | 10/1991 | Moshier | |
| 5,149,293 | A | | 9/1992 | Gable | |
| 5,308,278 | A | | 5/1994 | Huang | |
| 5,317,788 | A | * | 6/1994 | Esposito et al. | 24/300 |
| 5,414,903 | A | * | 5/1995 | Porteous | 24/9 |
| D363,900 | S | | 11/1995 | Roush et al. | |
| 5,590,545 | A | | 1/1997 | Norris | |
| 5,655,270 | A | * | 8/1997 | Boisvert | 24/336 |

(Continued)

FOREIGN PATENT DOCUMENTS

| | | |
|---|---|---|
| CA | 449605 | 7/1948 |
| CH | 324646 | 11/1957 |
| DE | 2 058 393 | 7/1971 |
| DE | 28 07 117 | 8/1978 |
| FR | 1 032 041 | 2/1951 |
| GB | 500297 | 8/1937 |

*Primary Examiner* — Gloria Hale
(74) *Attorney, Agent, or Firm* — Scully, Scott, Murphy & Presser, P.C.

(57) ABSTRACT

A bra strap retainer for preventing the straps from falling from the user's shoulders. The bra strap retainer includes a retaining member having an elongate main portion and opposite end portions which are adapted to keep straps of a bra on a user's back in proximate relationship to one another.

15 Claims, 2 Drawing Sheets

U.S. PATENT DOCUMENTS 5,662,133 A 9/1997 Guido, Jr.
5,733,004 A 3/1998 Celestina-Krevh et al.
5,935,044 A 8/1999 Brewster
6,381,752 B1 5/2002 Cartelli

* cited by examiner

BRA STRAP RETAINER

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of Application Ser. No. 10/609,431, filed Jun. 27, 2003, now abandoned, which was filed under my maiden name, Michelle D. Castro.

BACKGROUND OF THE INVENTION

1. Field of the Invention

The present invention relates to a bra strap coupler and more particularly pertains to a new bra strap retainer for preventing the straps from falling from the user's shoulders.

2. Description of the Prior Art

The use of a bra strap coupler is known in the prior art. More specifically, a bra strap coupler heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,733,004; U.S. Pat. No. 2,140,164; U.S. Pat. No. Des. 363,900; U.S. Pat. No. 2,278,153; U.S. Pat. No. 2,595,139; U.S. Pat. No. 3,529,329; and U.S. Pat. No. 5,662,133.

While these devices fulfill their respective, particular objectives and requirements, the aforementioned patents do not disclose a new bra strap retainer. The inventive device includes a retaining member having an elongate main portion and opposite end portions which are adapted to keep straps of a bra on a user's back in proximate relationship to one another.

In these respects, the bra strap retainer according to the present invention substantially departs from the conventional concepts and designs of the prior art, and in so doing provides an apparatus primarily developed for the purpose of preventing the straps from falling from the user's shoulders.

SUMMARY OF THE INVENTION

In view of the foregoing disadvantages inherent in the known types of bra strap coupler now present in the prior art, the present invention provides a new bra strap retainer construction wherein the same can be utilized for preventing the straps from falling from the user's shoulders.

The general purpose of the present invention, which will be described subsequently in greater detail, is to provide a new bra strap retainer which has many of the advantages of the bra strap coupler mentioned heretofore and many novel features that result in a new bra strap retainer which is not anticipated, rendered obvious, suggested, or even implied by any of the prior art bra strap coupler, either alone or in any combination thereof.

To attain this, the present invention generally comprises a retaining member having an elongate main portion and opposite end portions which are adapted to keep straps of a bra on a user's back in proximate relationship to one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bra strap retainer which has many of the advantages of the bra strap coupler mentioned heretofore and many novel features that result in a new bra strap retainer which is not anticipated, rendered obvious, suggested, or even implied by any of the prior art bra strap coupler, either alone or in any combination thereof.

It is another object of the present invention to provide a new bra strap retainer which may be easily and efficiently manufactured and marketed.

It is a further object of the present invention to provide a new bra strap retainer which is of a durable and reliable construction.

An even further object of the present invention is to provide a new bra strap retainer which is susceptible of a low cost of manufacture with regard to both materials and labor, and which accordingly is then susceptible of low prices of sale to the consuming public, thereby making such bra strap retainer economically available to the buying public.

Still yet another object of the present invention is to provide a new bra strap retainer which provides in the apparatuses and methods of the prior art some of the advantages thereof, while simultaneously overcoming some of the disadvantages normally associated therewith.

Still another object of the present invention is to provide a new bra strap retainer for preventing the straps from falling from the user's shoulders.

Yet another object of the present invention is to provide a new bra strap retainer which includes a retaining member having an elongate main portion and opposite end portions which are adapted to keep straps of a bra on a user's back in proximate relationship to one another.

Still yet another object of the present invention is to provide a new bra strap retainer that essentially pulls the straps on the user's back together.

Even still another object of the present invention is to provide a new bra strap retainer that is easy and convenient to wind the straps disposed upon the user's back through the bra strap retainer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
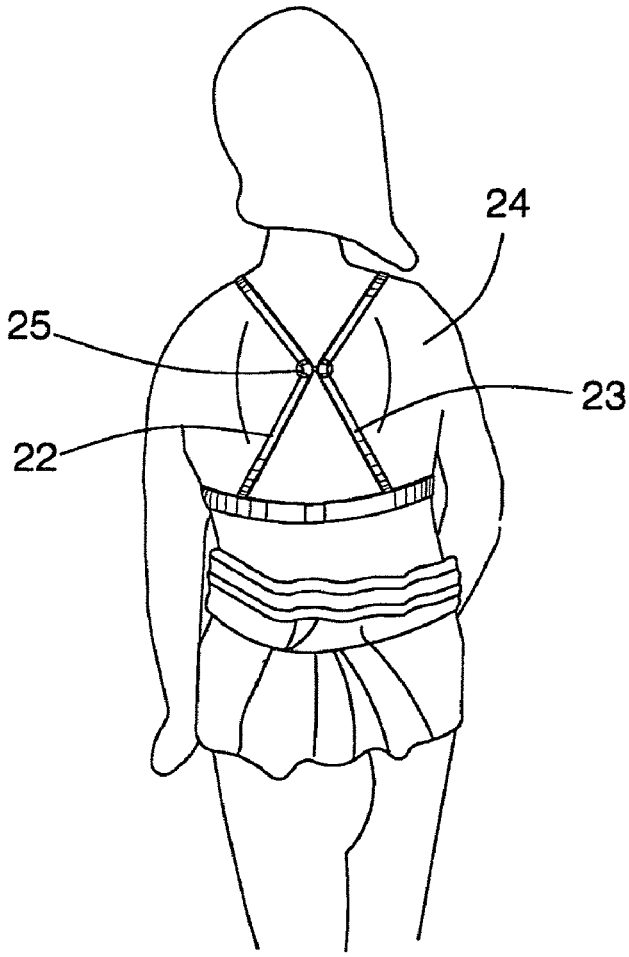
FIG. 1 is a side elevational view of a new bra strap retainer according to the present invention and being shown in use.

With reference now to the drawings, and in particular to FIGS. 1 through 4 thereof, a new bra strap retainer embodying the principles and concepts of the present invention and generally designated by the reference numeral 10 will be described.

Figure 2:
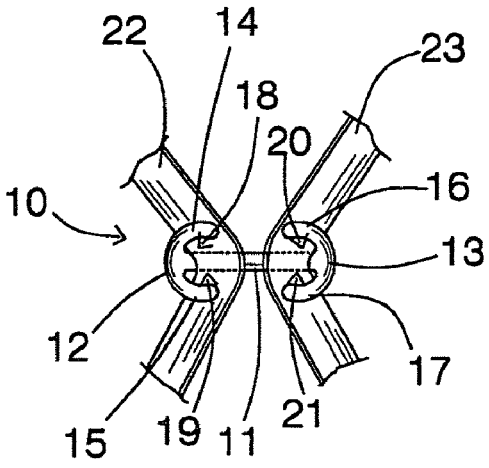
FIG. 2 is a detailed side elevational view of the present invention.
Figure 3:
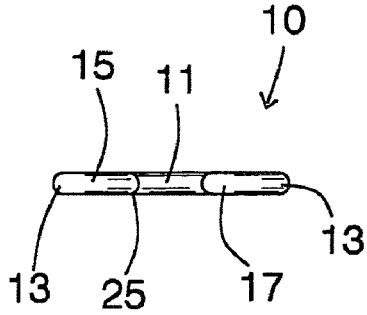
FIG. 3 is an edge elevational view of the present invention.
Figure 4:
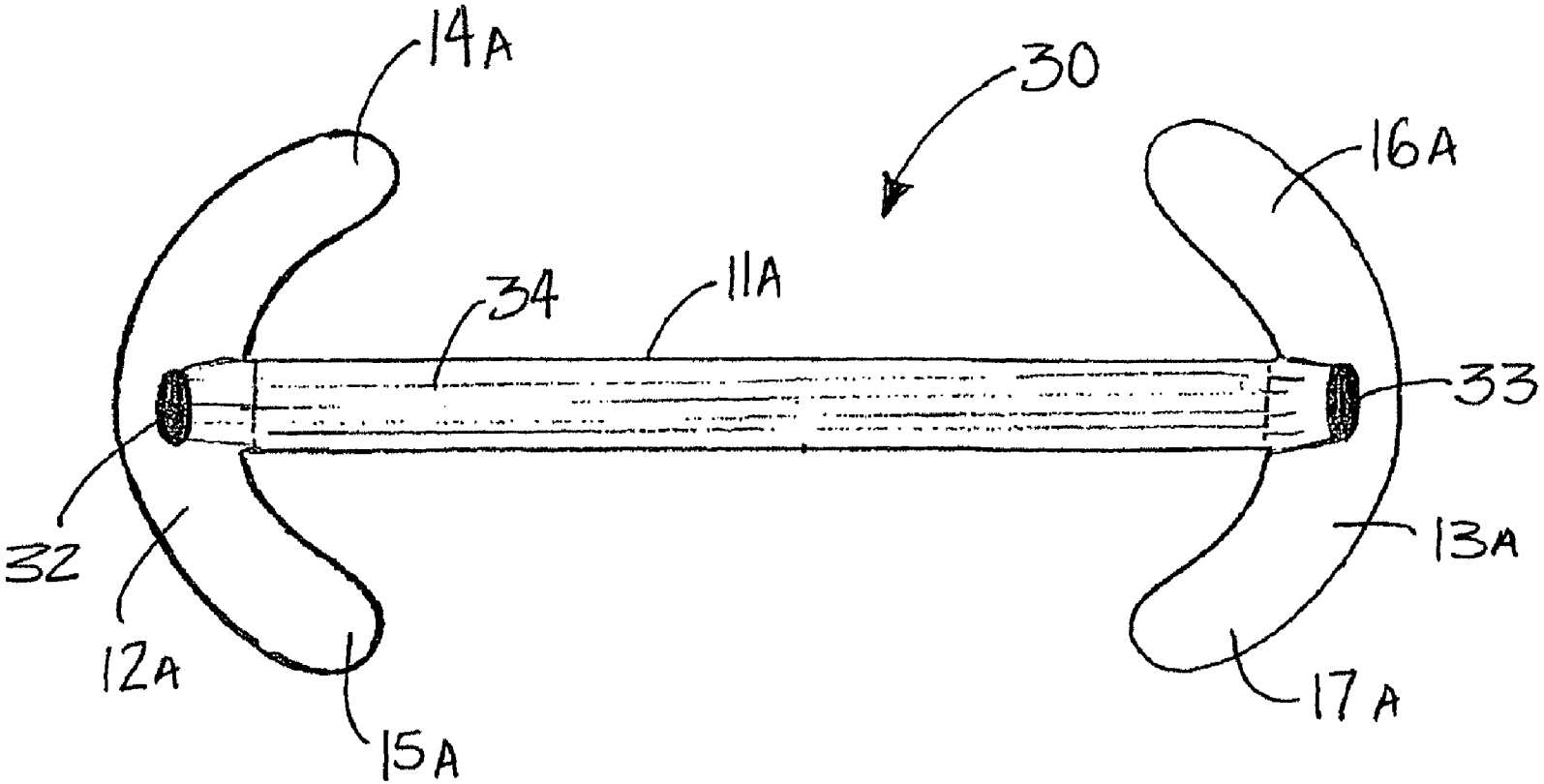
FIG. 4 is a side elevational view of an embodiment of the present invention.

As best illustrated in FIGS. 1 through 3, the bra strap retainer 10 generally comprises a retaining member 25 having an elongate main portion 11 and opposite end portions 12, 13 which are adapted to keep straps 22, 23 of a bra on a user's back 24 in proximate relationship to one another. Each of the end portions 12, 13 includes prongs 14 through 17 integrally extends outwardly therefrom and is spaced from the elongate main portion 11 thus defining a slot 18, 21 therebetween. The prongs 14 through 17 are essentially disposed in a plane with the elongate main portion 11 with the prongs 14 through 17 of each of the end portions 12, 13 extending outwardly from opposite side edges of the elongate main portion 11. Each of the prongs 14 through 17 of a respective end portion 12, 13 is curved and directed toward one of the prongs 14 through 17 of the other end portion 12, 13. Each of the prongs 14 through 17 has an outer portion which is essentially disposed parallel to the elongate main portion 11 with the prongs 14 through 17 and the elongate main portion 11 being adapted to retain the straps 22, 23 of the bra therebetween and with the straps 22, 23 being wound through the slots 18 through 21 between the prongs 14 through 17 and the elongate main portion 11. One of the end portions 12, 13 is essentially C-shaped, and the other of the end portions 12,13 is essentially an inverted C-shape.

Preferably, the retaining member 25 is substantially planar and does not extend out of a single plane, so that the profile of the retaining member beneath the garments of the wearer is minimized and less noticeable.

In one embodiment, the retaining member 25 has a length of approximately 1 inch and a thickness of approximately ⅛ inch with each end portion having a width of approximately 1 inch. In another preferred embodiment, the overall length of the retaining member 25 is approximately 2 inches, and the overall width is approximately one and one-half inches In yet another, larger embodiment, the retaining member 25 has an overall length of approximately two and one-half inches, and an overall width of approximately two inches.

In a variation of the aforedescribed embodiments, a bra strap retainer 30 (see FIG. 4) has a configuration similar to the embodiment 10, but significantly includes an elastomeric material that forms at least a section of the main portion 11a of the retainer 30. Beneficially, this elastomeric material provides the desired biasing of the straps toward each other, while providing a degree of flexibility and release during, for example, big or quick movements of the wearer. In at least one embodiment, this is implemented by forming a hole 32, 33 in each of the respective opposite end portions 12a, 13a toward a central location on the end portions, and an elastomeric band 34 extends through and between the holes 32, 33. In one embodiment, the length of the main portion 11a is approximately 4 inches in a relaxed, unstretched condition. It is contemplated that, in a stretched condition, the length of the main portion 11a could be extended by approximately 150 to 200 percent (e.g., from 4 inches to 6 to 8 inches) or possibly more. The end portions 12a, 13a are preferably formed of a somewhat rigid, but also resiliently flexible material, such as a suitable plastic material.

Optionally, the prongs 14a, 15a, 16a, and 17a may be more curved (is comparison to the aforedescribed embodiment 10) so that the prongs are angled more toward to opposite prong of the opposite end portion 12a, 13a.

In use, the user takes a portion of one of the straps 22, 23 disposed upon one's back 24 and winds it through the slots 18 through 21 between the elongate main portion 11 and the prongs 14 through 17 of one of the end portions 12, 13, and then takes a portion of the strap 22, 23 disposed upon one's back 24 and winds it through the slots 18, 21 between the elongate main portion 11 and the prongs 14 through 17 of the other end portion 12, 13 to essentially bring the two straps 22, 23 in close proximity of one another upon the user's back 24 to prevent the straps 22, 23 falling down from one's shoulders.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bra strap retainer comprising:

a retaining member having an elongate main portion and opposite end portions positioned at opposite ends of said main portion;

wherein each of said end portions includes a pair of prongs, each prong of a said pair of prongs extending outwardly from opposite sides of said main portion in substantially opposite directions, said prongs being spaced from said elongate main portion to define a slot therebetween;

wherein one said prong of a first said pair of prongs extends inwardly toward another one said prong of a second said pair of prongs;

wherein said main portion and said prongs of said end portions are all disposed in the same plane;

wherein each of said prongs has an outer portion which is essentially disposed parallel to said elongate main portion, said prongs and said elongate main portion being adapted to retain the straps of the bra therebetween with the straps being wound through said slots between said prongs and said elongate main portion.

2. A bra strap retainer as described in claim 1, wherein said main portion is formed substantially of an elastomeric material being resiliently extensible in length and said end portions are formed substantially of a flexible and non-stretchable material.

3. A bra strap retainer as described in claim 1, wherein each of said prongs of a respective said end portion is curved.

4. A bra strap retainer as described in claim 1, wherein one of said end portions is substantially C-shaped, and the other of said end portions is substantially an inverted C-shape.

5. A bra strap retainer as described in claim 1, wherein said retaining member engages the body of the straps without holes, eyelets, or loops being part of the straps.

6. A bra strap retainer comprising:

a retaining member having an elongate main portion and opposite end portions which are adapted to keep straps of a bra on a user's back in proximate relationship to one another, each of said end portions including prongs extending outwardly therefrom and being spaced from said elongate main portion thus defining a slot therebetween, said prongs being essentially disposed in a plane with said elongate main portion, said prongs of each of said end portions extending outwardly from opposite sides of said elongate main portion, each of said prongs of a respective said end portion being curved and directed toward one of said prongs of the other said end portion, each of said prongs having an outer portion which is essentially disposed parallel to said elongate main portion, said prongs and said elongate main portion being adapted to retain the straps of the bra therebetween with the straps being wound through said slots between said prongs and said elongate main portion, one of said end portions being essentially C-shaped, and the other of said end portions being essentially an inverted C-shape.

7. The bra strap retainer of claim 6 wherein said main portion is formed substantially of an elastomeric material being resiliently extensible in length and said end portions are formed substantially of a flexible and non-stretchable material.

8. In combination:

a bra with a pair of shoulder straps each having a rear section; and a bra strap retainer comprising:

a retaining member having an elongate main portion and opposite end portions which are adapted to keep straps of a bra on a user's back in proximate relationship to one another, said retaining member engaging the body of the straps without holes, eyelets, or loops being part of the straps, each of said end portions including prongs extending outwardly therefrom and being spaced from said elongate main portion thus defining a slot therebetween, said prongs being essentially disposed in a plane with said elongate main portion, said prongs of each of said end portions extending outwardly from opposite sides of said elongate main portion, each of said prongs of a respective said end portion being curved and directed toward one of said prongs of the other said end portion, each of said prongs having an outer portion which is essentially disposed parallel to said elongate main portion, one of said end portions being essentially C-shaped, and the other of said end portions being essentially an inverted C-shape;

wherein each of said shoulder straps extends inward of said prongs of one of said opposite end portions with respect to the body of a wearer of said bra such that each of said end portions engages one of said shoulder straps; and wherein each of said shoulder straps extends outward of said elongate main portion with respect to the body of the wearer of the bra such that said straps being wound through said slots between said prongs and said elongate main portion.

9. The combination of claim 8 wherein said retaining member has a length of approximately 1 inch and a thickness of approximately ⅛ inch with each end portion having a width of approximately 1 inch.

10. The combination of claim 8 wherein said main portion of said bra strap retainer is formed substantially of an elastomeric material being resiliently extensible in length and said end portions of said bra strap retainer are formed substantially of a flexible and non-stretchable material.

11. The combination of claim 8 wherein each of said slots has a depth and each of said straps has a width, the depth of each of said slots being between at least approximately 50% of said width of said strap.

*12. A method of preventing the slippage of bra straps off of the shoulders of a person wearing a bra, comprising:*

*providing a bra strap retainer comprising at least a pair of strap-retaining members positioned at opposite ends of the retainer, respectively, and an elongated member extending between the strap-retaining members;*

*positioning the bra strap retainer in the back region of the person, between the straps of a bra being worn by the person;*

*placing a first bra strap into a retained position by placing the strap in a first pair of slots located between the strap-retaining members and the elongated member; and*

*placing a second bra strap into a retained position by placing the strap in a second pair of slots located between the strap-retaining members and the elongated member;*

*wherein the bra strap retainer brings the first and second straps in close proximity with each other in a location on the person's back, thereby preventing the straps from slipping off the person's shoulder.*

*13. The method of claim 12, wherein the bra strap retainer comprises strap-retaining members positioned at opposite ends of the elongated member.*

*14. The method of claim 12, wherein each strap-retaining member is curved inward towards the opposite strap-retaining member.*

*15. The method of claim 13, wherein the elongated member extends across the bra strap retainer from opposite ends of the bra strap retainer.*

* * * * *